March 24, 1942.   C. B. MOORE   2,277,131
AUTOMATIC CONTROL APPARATUS
Filed Feb. 4, 1938   2 Sheets-Sheet 1
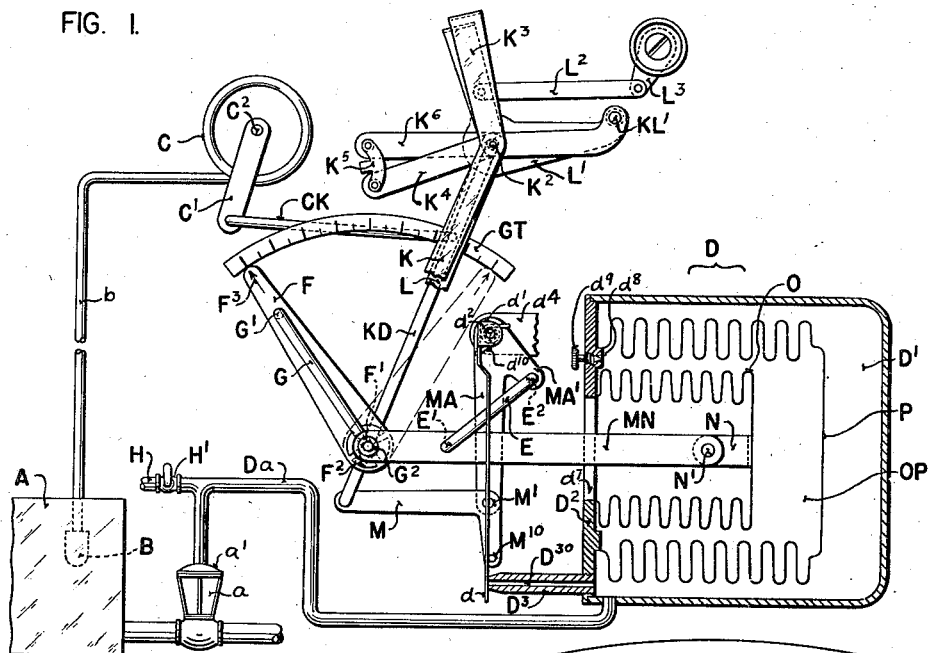
INVENTOR.
COLMAN B. MOORE
BY George M. Munschauer
ATTORNEY March 24, 1942.  C. B. MOORE  2,277,131
AUTOMATIC CONTROL APPARATUS
Filed Feb. 4, 1938  2 Sheets—Sheet 2

INVENTOR.
COLMAN B. MOORE
BY
ATTORNEY

Patented Mar. 24, 1942                                          2,277,131

UNITED STATES PATENT OFFICE 2,277,131

AUTOMATIC CONTROL APPARATUS

Coleman B. Moore, Carroll Park, Pa., assignor to
The Brown Instrument Company, Philadelphia,
Pa., a corporation of Pennsylvania Application February 4, 1938, Serial No. 188,739

2 Claims. (Cl. 236—86)

The general object of the present invention is to provide improved control apparatus of the type comprising what may be called an air controller, by means of which variations in a measurable controlling condition produce predetermined changes in a pressure fluid, ordinarily air under pressure, which thus forms a control force, which in magnitude is a definite function of the controlling condition, and which may be employed directly, or more usually through a relay mechanism, to vary some controlled condition, which may or may not react upon the controlling condition. Such control apparatus has a wide range of use, as the controlling condition may be any condition, such as temperature, pressure or velocity, for example, constituting or creating a measurable force or action.

More specific objects of the present invention are to provide improvements in the mechanism by which the fluid pressure control force is regulated or varied in accordance with variations in the controlling condition, those improvements being partly mechanical and of especial importance from the standpoint of mechanical simplicity and effectiveness, but also including novel provisions contributing to a sensitive or quickly responsive regulatory action, and to a reduction in the hunting tendency which sensitive regulatory action ordinarily tends to produce.

Still more specifically it is an object of the invention to provide means whereby the control mechanism may be adjusted for particular requirements of service. In fluid pressure actuated control apparatus of the type with which this invention is concerned, an element sensitive to a variable condition such as temperature, is adapted to vary the pressure upon a fluid motor such as a fuel valve, governing the condition such as temperature, or governing some related condition. For different processes the relation of condition change to corrective action sometimes referred to as the "throttling range" or sensitivity of the control apparatus, is necessarily different. The present invention provides means for ready adjustment of this relation.

The various features of novelty which characterize my invention are pointed out with particularity in the claims annexed to and forming a part of this specification. For a better understanding of the invention, however, and the advantages possessed by it, reference should be had to the accompanying drawings and descriptive matter in which I have illustrated and described preferred embodiments of the invention.

Of the drawings:

Fig. 1 is a more or less diagrammatical view of one type of control apparatus illustrating the invention;

Fig. 2 is another embodiment of the invention;

Figure 3:
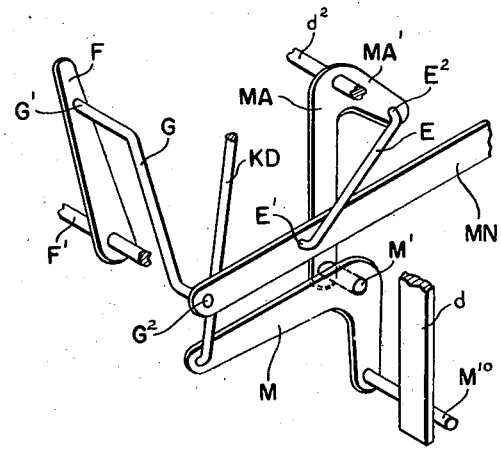
Fig. 3 is a perspective view of the linkage mechanism shown in Fig. 1.
Figure 4:
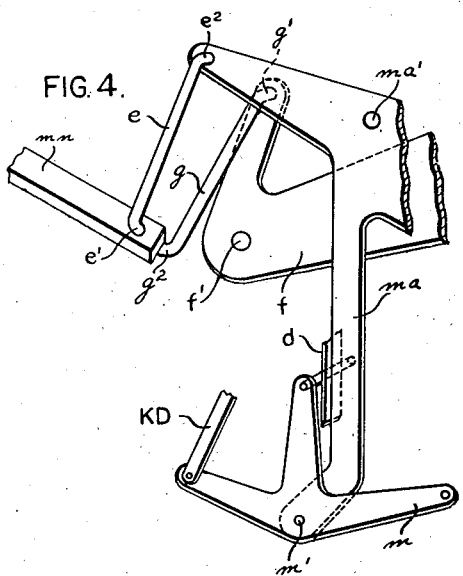
Fig. 4 is a perspective view of the linkage mechanism in Fig. 2.

The particular form of control system diagrammatically shown by way of example in Fig. 1, is adapted to adjust a fuel supply valve or other controller $a$, to thereby regulate the supply of heat to a furnace A as required to maintain an approximately constant furnace temperature which is measured by an expansion fluid thermometer of which B is the temperature responsive bulb or chamber. The fluid pressure in chamber B, which increases and decreases as the furnace temperature rises and falls, is transmitted by a conduit $b$ to a pressure responsive element C, shown as a Bourdon tube of helical form having its stationary end connected to the conduit $b$, and having its movable end secured to an arm $C'$, which is pivoted to turn about an axis $C^2$, clockwise or counter-clockwise, as the pressure in the tube rises or falls.

Through suitable connections, the oscillations of the arm $C'$ give motion to the valve $d$, which, as shown, forms a part of a control pressure regulator or air controller unit D, and regulates the escape of air from, and thereby regulates the control air pressure in the regulator chamber $D'$. The latter receives air through a pipe H, and a restriction $H'$. The pressure in the chamber $D'$ is transmitted by conduit Da to the chamber $a'$ of the fuel valve $a$.

All the above-mentioned parts, except the furnace A, valve $a$ and bulb B, are advantageously combined in a control instrument, which as shown in Fig. 2, may well be a recording meter similar in general form to a commercial type of meter used for recording temperature and pressure. Such a meter may include a cylindrical casing I having an upper segmental partition wall $I'$ adapted to cooperate with a lower segmental partition wall IB, to cover the front of the casing and support a chart and chart driving motor not shown. The front of the instrument may be covered by a bezel not shown.

The meter pen or indicating pointer is carried by an element K pivoted to oscillate about an axis $K^2$. The major portion of the element K is back of the wall $I'$ but an arm portion $K^3$ extends through a wall slot $I^2$. A normally adjustable index L may be set to indicate the normal temperature to be maintained or approximated. The element K is oscillated about the axis $K^2$ through a link CK by the member C', which, with the Bourdon tube C, is in the meter casing I back of the wall I'. The pressure regulator or air controller unit D is also located in the casing I back of the wall I'.

The air controller unit D, in the preferred construction illustrated, comprises a cup-shaped casing body forming the cylindrical outer wall and one end wall of the chamber D'. The open end of the casing body is normally closed by an end head $D^2$ removably attached thereto. The bleeder outlet $D^{30}$ from the chamber D' controlled by the valve $d$ is formed by the axial passage in a bolt-like nozzle member $D^3$ threaded through an opening in the head $D^2$ and having its enlarged outer end rounded to form a convex surface facing the valve $d$ and the annular portion of which immediately adjacent the passage $D^{30}$ forms a seat for the valve $d$. The latter is in the form of a thin plate or bar which extends generally parallel to and diametrally of the end head $D^2$, with one end in front of the nozzle part $D^3$ which is located adjacent one side of the end head. The end of the valve member $d$ remote from the nozzle $D^3$ is pivotally connected to the end head $D^2$. As shown the pivotal connection comprises spaced apart transverse projections $d'$ from the valve member $d$, and a hinge shaft $d^2$ passing through those projections and through hinge lugs $d^4$ carried by the end head $D^2$.

The operating connections for the valve member $d$ include a bell crank lever M. As shown, the lever M is carried on a pin M' carried by a second bell crank lever MA. Lever MA is pivoted at $d^2$ and is connected by a link E to a link MN attached to abutment N, the purpose of which is later described. Bell crank M is connected by a link KD with the control point setting device L and the pen K. Lever M is provided with a pin $M^{10}$ adapted to engage the under side of valve $d$, and at times carry the latter away from the nozzle $D^3$ against the action of spring $d^{10}$, which tends to move the valve toward the nozzle. This, in effect, gives a pivotal connection between the valve member $d$ and the lever M.

The link KD is pivotally connected to a lever $K^4$ pivoted at KL' to a generally horizontal arm L' of the control point setting index L. A link $L^2$ is pivoted at one end to member L and at its other end to rotatable member $L^3$, whereby manual rotation of the latter will vary the position of pivot point KL', and simultaneously adjust the index L to indicate the condition value to be maintained. Lever $K^4$ is rotated about pivot KL' by means of link $K^5$ to which it is attached, when the arm $K^6$ attached to pen K and also attached to link $K^5$ is rotated by the temperature responsive arm C'. Thus upon movement of arm C', the link KD will be raised or lowered accordingly.

As the element $K^4$ rotates clockwise or counter-clockwise in response to an increase or decrease of pressure in the Bourdon tube C, the lever M is correspondingly oscillated, and as a result of the reaction between the lever and the abutment N, the valve member $d$ is thereby moved away from or toward the nozzle $D^3$ and consequently decreases or increases the air pressure in the chamber D'.

For purposes hereinafter explained, the abutment N is not stationary but is moved toward and away from the valve member $d$, following and as a result of an increase or decrease respectively in the pressure in the chamber D'. The abutment N is so moved as a result of the variations in the air pressure acting on the outer side of a bellows element O which is axially disposed within the device D and of which the abutment N forms a movable end wall. The end of the bellows element O remote from the abutment N is anchored to the end head $D^2$. The interior of the bellows is in free communication with the atmosphere through the center opening $d^7$ in the end head $D^2$. Surrounding the bellows O is a second bellows P which has its inner end closed and its outer end connected to the end member $D^2$. The chamber space OP between the bellows elements O and P is in restricted communication with the atmosphere through a passage $d^8$ in the end wall $D^2$, the rate of air flow through said passage being regulable. The means shown for regulating the flow through the passage $d^8$ is in the form of a grooved screw obturator $d^9$ threaded into the outer end of the passage, and throttling the latter more or less, according to the extent to which it extends into the passage.

Each of the bellows elements O and P has longitudinal resilience. In consequence each bellows has a definite length when the pressures acting on its inner and outer walls are the same. When those pressures are unequal, the extent to which the bellows is contracted if the external pressure exceeds the internal pressure, or is elongated if the internal pressure exceeds the external pressure, is that required to make the differential of the internal and external pressures acting on the bellows, equal to the opposing resilient bellows force which results from the contraction or elongation of the bellows, said resilient force of itself always tending to return the bellows to its normal or unstressed length.

On an increase in the pressure within the Bourdon tube C and a consequent movement of the part $K^4$ in the clockwise direction, the valve $d$ is moved by a corresponding distance away from the nozzle $D^3$, thereby reducing the pressure in D'. The pressure reduction in D' elongates the bellows P. The first effect of its elongation is to enlarge the inter-bellows space OP and to reduce the pressure in the latter owing to the relatively slow inflow of air permitted by the restricted passage $d^8$. The reduction in pressure in OP elongates the bellows O. The resultant movement of the abutment N away from the end head $D^2$ moves the valve $d$ back toward the nozzle $D^3$, through lever and link mechanism later described, thereby tending to increase the pressure in chamber D'. In practice the mechanism is so proportioned and adjusted that the effect on the pressure in D' of a change in position of the part $K^4$ is only partially neutralized by the effect of the pressure change on the length of the bellows O. The decrease in pressure in chamber OP produces an inflow of air through the passage $d^8$ which tends to slowly bring the pressure in chamber OP into equality with the pressure of the atmosphere. As the pressure in the chamber OP builds up, the bellows O shortens and thereby moves the valve $d$ away from the nozzle $D^3$ and back towards the position into which it was moved on the original change in position of the part $K^4$, provided the latter remains stationary in the meantime. The converse of the actions just described occur on a decrease in the pressure in the Bourdon tube C and a corresponding adjustment of the part $K^4$ in the counter-clockwise direction.

While the adjustment at any time of the valve mechanism comprising the port or passage $D^{30}$ and member $d$, depends on the relative positions at the time of the parts $K^4$ and N, the position and movement of each of those parts is independent of the position of the other. It is to be noted, moreover, that the apparatus is so proportioned that the repulsive effect on the valve $d$ of the air flow through the port $D^{30}$ is too small to have any significant effect on the positions and movements of either of the parts $K^4$ and N.

From what has just been said, it will be apparent that the first effect of a change in the controlling condition and corresponding change in the part $K^4$ is to produce a corresponding initial change in pressure in the chamber D'. This initial change in pressure in the chamber D' is automatically followed by a smaller reverse change in pressure, as the initial change effects a reversal of direction of the change in the controlling condition and the control apparatus may be adjusted so that the corresponding initial adjustment of the control valve $a$ is quick enough and great enough to produce a substantial corrective effect without giving rise to such a hunting difficulty as would exist but for the automatic reverse change in pressure in the chamber D'.

If it be assumed, for example, that an initial clockwise change of the position of the part $K^4$ occurs as a result of an increase in temperature due to a decrease in furnace load which continues for some time so that less fuel is needed than was previously required, said change may well produce a temporarily excessive initial decrease in pressure in chamber D', such that, if maintained, fuel would be supplied to the furnace more slowly than required to continuously meet the then existing demand on the furnace for heat. The extent of this decrease in pressure in D' is gauged by the movement given the valve $d$ by the expansion of the bellows O, occurring as a result of such decrease. Such initial excess in fuel reduction tends quickly to arrest the rise of the furnace temperature, and to decrease that temperature. As the furnace temperature falls, the lever $K^4$ turns counter-clockwise and the tendency to an excessive decrease in that temperature is neutralized more or less by an accompanying increase in pressure in the chamber D', resulting from the movement given the valve $d$ by the counter-clockwise motion of lever $K^4$, the magnitude of the increase being gauged by the compression of bellows O occurring as a result of such increase. The subsequent slow compression of the bellows O, as the pressure in the chamber OP approaches equality with that of the atmosphere, again tends to decrease the fuel supply to the furnace, but unless the furnace load has become still smaller in the meantime, the effect on position of the valve $d$ of such compression of the bellows O will be partially neutralized by the decrease in the furnace temperature and resultant counter-clockwise change in position of the part $K^4$. If the demand on the furnace for heat does not change after the bellows O has contracted to its normal or unflexed length, the valve $d$ will come to rest with the part $K^4$ in a position corresponding to a furnace temperature slightly higher than would exist in a stable operating condition with a larger demand on the furnace for heat.

The means through which the movements of abutment N effect follow up movements of the valve $d$ are important from the standpoint of ease of adjustment in the field, since ordinarily such adjustment is made experimentally while the instrument is in service dependent upon the process requirements. To facilitate this adjustment commonly termed the "throttling range" adjustment, I do not connect the link MN directly to the lever MA but provide adjustable linkage therebetween by means of which the ratio of movement of abutment N to the movement of lever MA may be varied. Since this ratio determines the degree of neutralization or follow up movement resulting from an initial movement of valve $d$, the final pressure change in chamber D' and valve $a$, resulting from a given movement of valve $d$ and pen K, is thereby determined.

To this end link E is pivotally connected at one end to an arm MA' of bell crank MA and at the other end to link MN, and the latter is constrained to travel on a path determined by the existing throttling range adjustment. The latter adjustment is effected by rotation of a lever F which is journalled in the instrument framework at F', and pivotally carries at G' one end of a link G. The opposite end $G^2$ of link G pivotally supports the link MN and by virtue of the freedom of the latter to pivot at N', the path of movement of the point $G^2$ will be circularly about G' in any adjusted position of the lever F. Lever F is frictionally held in any position to which it may be adjusted by a friction disc $F^2$.

The path of lever MN will thus determine the amount of movement, resulting from a given movement of abutment N, which will be imparted to lever MA through link E attached to link MN at E' and to lever MA at $E^2$, as will be clear. When lever F is in the full line position of Fig. 1, in which the axes of pivots F' and $G^2$ are aligned and links G and E are at right angles, the movement of lever MA in response to a given movement of link MN will be maximum. That movement will be zero when the lever F is adjusted toward the dotted line position of Fig. 1, and into the position in which links G and E are parallel. From the foregoing it will be clear that following a pressure change in chamber D' as a result of a movement of lever $K^4$ and valve $d$, a partial neutralization will take place as a result of the movement of abutment N, and by an amount dependent upon the adjustment of lever F, which is termed the "throttling range" adjustment. A scale GT suitably calibrated and with which index $F^3$ on lever F cooperates, may be provided to facilitate adjustment of the throttling range.

In Fig. 2 is illustrated an embodiment of the invention which is more simple than the device of Fig. 1 in respect to the normal control functions. The corresponding reference letters of Figs. 1 and 2 indicate like parts, while the letters $d^{30}$, $n$, $n'$, $mn$, $e$, $e^2$, $ma$, $m'$, $m$, $f$, $g$, $g'$, and $g^2$ of Fig. 2 indicate parts equivalent in general purpose to the parts $D^{30}$, N, N', MN, E, $E^2$, MA, M', M, F, G, G', and $G^2$ of Fig. 1. In Fig. 2, however, there are no elements corresponding to the bellows P, and obturator parts $d^8$ and $d^9$, and the corresponding control function attained with the use of those parts is not attained with the apparatus of Fig. 2. The omitted function namely, compensation or reset for load variations, is unnecessary or undesirable for the purposes for which the apparatus of Fig. 2 is intended, but the throttling range adjustment means is equally applicable to this form of regulator. In this form the nozzle $d^{30}$ need not communicate directly with the chamber D' as does the nozzle $D^{30}$ of Fig. 1, though fundamentally it may, but is adapted to be connected to an intermediate booster air relay which in turn may be connected to chamber D' to govern the pressure therein. On a movement of valve $d$ the pressure in nozzle $d^{30}$ is changed proportionally changing the pressure in chamber D', whereby bellows O is expanded or contracted against the normal bellows resiliency tending to maintain a given length, which may be supplemented by opposed springs OA and OB. Corresponding movements are thereby given link $mn$, pivoted at $n'$, to abutment $n$, in a path determined by the link $g$, pivoted to link $mn$ at $g^2$ and to relatively fixed lever $f$ at $g'$.

The lever $f$ is adjusted by a spur gear and segment arrangement whereby the pivot $g'$ is positioned. The links $e$ and $g$ are pivoted to the link $mn$ at a common point $g^2$ so that when the adjustment of lever $f$ is such as to align the axes of pivots $e^2$ and $g'$, no movement of lever $ma$ results from the movement of link $mn$. When pivots $e^2$ and $g'$ are displaced however, lever $ma$ will be moved by link $mn$, on a movement of the latter, by an amount depending upon the path of pivot $g^2$ which is constrained to move about pivot $g'$ as a center. An index may be provided on the plate IB adjacent the window IB' to cooperate with a dial, visible through the window and carried by the adjusting means for lever $f$, whereby a calibrated adjustment of the throttling range can be made.

It is noted that my throttling range adjustment is useful in a device in which no follow up action such as is effected by bellows O, is employed. In operating a simple air controller with no such action, a connection is usually made from a member responsive to the condition directly to the control member or valve $d$. If in the device of Fig. 2, for example, the bulb $b$ is considered as connected to the pipe Da, the Bourdon tube $c$ and associate link CK and pen K omitted, and link $K^5$ made stationary, variation in temperature in the furnace will adjust valve $d$ through link $mn$ thereby varying the pressure in pipe DA, which in this case would be directly connected to the valve $a$ independently of chamber D'. Adjusting means $L^3$ may then be used to determine the value of the condition to be maintained, the link KD acting on one arm of lever $m$ solely for that purpose and the link $mn$ acting on another arm of lever $m$ in response to the measured condition. In the various forms I consider the lever F or $f$ as a ratio adjusting lever.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. In a pneumatic control device, an element deflectable in accordance with changes in a measurable condition, a nozzle supplied with air under pressure and communicating with pressure responsive means controling said condition, a movable member adapted to cooperate with said nozzle to effect control of said condition proportionately to its position, means including a floating lever connecting said element and member for movement of the latter by said element, means adapted to partially neutralize the pressure change resulting from a movement of said member including a part responsive to said pressure change and a connection between said part and member including a link pivotally attached at one end to said part, a second link, a ratio adjusting member supporting one end of said second link, a connection between the second ends of said two links adapted to constrain movement of said first link through a path depending upon the position of said ratio adjusting member, and a third link pivoted to said first link at a point between its connection to said pressure responsive part and said second link and operative to connect said first link and floating lever to move said member by movement of said first link.

2. In a control device, an element deflectable in accordance with changes in a measurable condition, a movable member adapted to effect control of said condition proportionately to its position, means including a floating lever connecting said element and member for movement of the latter by said element, means adapted to partially neutralize the control effect of said member including a second element responsive to said effect and a connection between the second mentioned element and member including a link connected thereto and means to vary the movement of said link for a given movement of said second element comprising a part to movably support the outer end of said link, an adjustable support for said part whereby as the position of the support is changed the part will constrain said link for movement through different paths, a second link pivoted to said first link between its points of connection with said second element and said part, and a lever moved by said second link to act on said floating lever whereby the latter will be moved by said first link to adjust the movable member.

COLEMAN B. MOORE.